US012213602B2

(12) United States Patent
Ko

(10) Patent No.: US 12,213,602 B2
(45) Date of Patent: Feb. 4, 2025

(54) GOODS PROPULSION DEVICE AND A SHELF WITH THE PROPULSION DEVICE

(71) Applicant: Sap Products Limited, Dongguan (CN)

(72) Inventor: Yiu Fai Ko, Kowloon (HK)

(73) Assignee: SAP PRODUCTS LIMITED, Guangdong (CN)

( * ) Notice: Subject to any disclaimer, the term of this patent is extended or adjusted under 35 U.S.C. 154(b) by 0 days.

(21) Appl. No.: 18/486,757

(22) Filed: Oct. 13, 2023

(65) Prior Publication Data
US 2024/0122374 A1    Apr. 18, 2024

(30) Foreign Application Priority Data

Oct. 14, 2022 (CN) .......................... 202222732983.0

(51) Int. Cl.
*A47F 1/12* (2006.01)
*F16H 19/04* (2006.01)

(52) U.S. Cl.
CPC .............. *A47F 1/126* (2013.01); *F16H 19/04* (2013.01)

(58) Field of Classification Search
CPC .......... A47F 1/126; A47F 5/005; A47F 1/125; F16H 19/04
USPC ....................................... 211/1.57, 59.3, 184
See application file for complete search history.

(56) References Cited

U.S. PATENT DOCUMENTS

| 2,079,754 | A | * | 5/1937 | Waxgiser | ................ | A47F 1/125 |
| | | | | | | 211/59.3 |
| 4,830,201 | A | * | 5/1989 | Breslow | .................. | A47F 1/126 |
| | | | | | | 211/59.3 |
| 5,110,192 | A | * | 5/1992 | Lauterbach | ............. | A47F 1/126 |
| | | | | | | 221/124 |
| 5,161,702 | A | * | 11/1992 | Skalski | ................... | A47F 1/126 |
| | | | | | | 211/59.3 |
| 5,613,621 | A | * | 3/1997 | Gervasi | ................... | G07F 11/38 |
| | | | | | | 221/6 |
| 6,129,218 | A | * | 10/2000 | Henry | ..................... | A47F 5/005 |
| | | | | | | 211/59.3 |
| 6,227,385 | B1 | * | 5/2001 | Nickerson | ............... | A47F 1/126 |
| | | | | | | 211/59.3 |
| 6,409,028 | B2 | * | 6/2002 | Nickerson | ............... | A47F 1/126 |
| | | | | | | 211/59.3 |
| 6,523,703 | B1 | * | 2/2003 | Robertson | ............... | A47F 1/126 |
| | | | | | | 211/59.3 |
| 6,655,536 | B2 | * | 12/2003 | Jo | .......................... | A47F 1/126 |
| | | | | | | 211/59.3 |
| 6,820,754 | B2 | * | 11/2004 | Ondrasik | ................ | A47F 1/126 |
| | | | | | | 211/59.3 |

(Continued)

*Primary Examiner* — Jennifer E. Novosad
(74) *Attorney, Agent, or Firm* — MUNCY, GEISSLER, OLDS & LOWE, P.C.

(57) ABSTRACT

A goods propulsion device and a shelf with the propulsion device include a partition plate, a push plate slidably connected with the partition plate, a gear rack configured on the partition plate, a gear rotatably connected to the push plate and a reset member connected to the push plate and the partition plate. The gear is meshed with the gear rack. The gear rack is configured along the length direction of the partition plate. The reset member is used for driving the push plate to reset relative to the partition plate. The present invention has a simple and compact structure. Users can assemble the goods propulsion devices with different types or sizes of bottom plates according to their actual needs.

8 Claims, 3 Drawing Sheets

(56) References Cited

U.S. PATENT DOCUMENTS

| | | | | |
|---|---|---|---|---|
| 7,028,852 B2* | 4/2006 | Johnson | A47F 1/126 | 211/59.3 |
| 7,347,335 B2* | 3/2008 | Rankin, VI | A47F 1/126 | 312/61 |
| 7,506,769 B2* | 3/2009 | Howerton | A47F 1/126 | 211/59.3 |
| 7,641,072 B1* | 1/2010 | Vlastakis | A47F 3/002 | 221/229 |
| 8,172,094 B2* | 5/2012 | Meyer | A47F 5/005 | 211/59.3 |
| 8,353,425 B2* | 1/2013 | Lockwood | G07F 9/002 | 221/227 |
| 8,386,075 B2* | 2/2013 | Lockwood | G07F 17/10 | 221/152 |
| 8,627,965 B2* | 1/2014 | Hardy | A47F 1/126 | 211/59.3 |
| 9,119,488 B2* | 9/2015 | Lockwood | G07G 3/003 | |
| 9,901,188 B2* | 2/2018 | Murphy | A47F 1/126 | |
| 10,159,360 B2* | 12/2018 | Bryson | A47F 1/126 | |
| 10,172,482 B2* | 1/2019 | Pritchard | A47F 1/126 | |
| 10,463,173 B2* | 11/2019 | Robbins | A47F 1/126 | |
| 10,548,414 B2* | 2/2020 | Kologe | A47F 1/126 | |
| 10,555,623 B2* | 2/2020 | Kologe | A47B 57/58 | |
| 11,627,818 B2* | 4/2023 | Hua | A47F 1/126 | 211/59.3 |
| 2005/0189369 A1* | 9/2005 | Vlastakis | G07F 9/02 | 221/123 |
| 2006/0163272 A1* | 7/2006 | Gamble | A47F 1/126 | 221/227 |
| 2006/0237381 A1* | 10/2006 | Lockwood | A47F 1/126 | 211/59.3 |
| 2007/0108142 A1* | 5/2007 | Medcalf | A47F 1/126 | 211/59.3 |
| 2010/0258513 A1* | 10/2010 | Meyer | A47F 1/126 | 211/59.3 |
| 2014/0151313 A1* | 6/2014 | Breslow | A47F 1/04 | 211/59.3 |
| 2017/0164762 A1* | 6/2017 | Bryson | A47F 7/281 | |
| 2018/0153313 A1* | 6/2018 | Padvoiskis | A47F 5/005 | |
| 2023/0210277 A1* | 7/2023 | Ewing | G06K 7/1417 | 705/28 |
| 2024/0122374 A1* | 4/2024 | Ko | F16H 19/04 | |

* cited by examiner

GOODS PROPULSION DEVICE AND A SHELF WITH THE PROPULSION DEVICE

FIELD OF THE INVENTION

The present invention relates to the technical field of self-service vending, in particular to a goods propulsion device and a shelf with the propulsion device.

BACKGROUND

In recent years, with the development of the times, there are more and more supermarkets and convenience stores. Supermarkets and convenience stores generally use shelves to store goods for sale. Staff place goods on a bottom plate of a shelf in sequence from inside to outside and wait for sale. After the goods on the outer side of the shelf are sold, there is empty space on the outside of the shelf. This requires staff to move the goods located at the back forward, resulting in heavy workloads and laborious work for staff. Furthermore, it is inconvenient to connect and disassemble an existing goods propulsion device with a frame body of a shelf, and it is necessary to replace different frame bodies in order to make a frame body compatible with the goods propulsion device, which increases the cost of goods pushing. In addition, existing propulsion devices push glass goods at a fast speed. The glass goods are easy to fall or tip over under the action of driving force, resulting in damage to the glass goods. Therefore, the defects are apparent and a solution needs to be provided.

SUMMARY OF THE INVENTION

In order to solve the aforementioned technical problems, it is an object of the present invention to provide a goods propulsion device and a shelf with the propulsion device.

In order to achieve the above object, the present invention adopts the following technical solutions:

A goods propulsion device, comprising a partition plate, a push plate slidably connected to the partition plate, a gear rack configured on the partition plate, a gear rotatably connected to the push plate, and a reset member connected to both the push plate and the partition plate. The gear is meshed with the gear rack. The gear rack is configured along the length direction of the partition plate. The reset member is used for driving the push plate to reset relative to the partition plate.

Further, the gear is a dampening gear.

Further, the partition plate is configured with a sliding groove. The gear rack is configured on the inner side wall of the sliding groove. The upper and lower sides of the push plate are respectively configured with snap structures. The two snap structures are respectively slidably engaged with the upper and lower side walls of the sliding groove.

Further, the gear is rotatably configured within the snap structures and can protrude into the sliding groove.

Further, the goods propulsion device further includes two snap grooves respectively configured at both ends of the partition plate and two connecting members respectively concave-convexly adapted to the two snap grooves.

A shelf comprises a shelf body, the aforementioned goods propulsion device and a bottom plate detachably connected to the partition plate.

Further, the number of the goods propulsion devices is set to be a plurality, and a plurality of the goods propulsion devices are configured side by side on the bottom plate.

Further, the goods propulsion device further comprises a blocking plate located at one end of the partition plate. The blocking plate is configured on the bottom plate.

Beneficial effects of the present invention: the structure of the present invention is simple and compact. Users can assemble the goods propulsion devices with bottom plates of different types or sizes according to their actual needs, thereby completing the assembly of the goods propulsion device and the bottom plate, and then the bottom plate is connected to the frame body. The assembly of the goods propulsion device and the frame body is convenient. The goods propulsion device has strong practicability and good applicability. The goods propulsion of the goods propulsion device is convenient. The production and installation of the reset member are convenient. The reset of the push plate is convenient. The push plate has good stability and high precision when moving relative to the partition plate. Since the speed of pushing goods is slow during the push plate cooperating with the gear, the goods are not easily overturned, which improves stability and safety during goods conveying process.

MARKING DESCRIPTIONS OF THE DRAWINGS

1. Partition plate; 2. Push plate; 3. Gear; 4. Gear rack; 5. Bottom plate; 6. Reset member; 7. Sliding groove; 8. Snap structure; 9. Blocking plate; 10. Snap groove; 11. Connecting member.

DESCRIPTION OF THE PREFERRED EMBODIMENTS

In order to facilitate the understanding of the skilled person in the art, the present invention will be further described below in the embodiments with reference to the accompanying drawings. The contents mentioned in the embodiments are not limitations of the present invention.

Embodiment One

Figure 1:
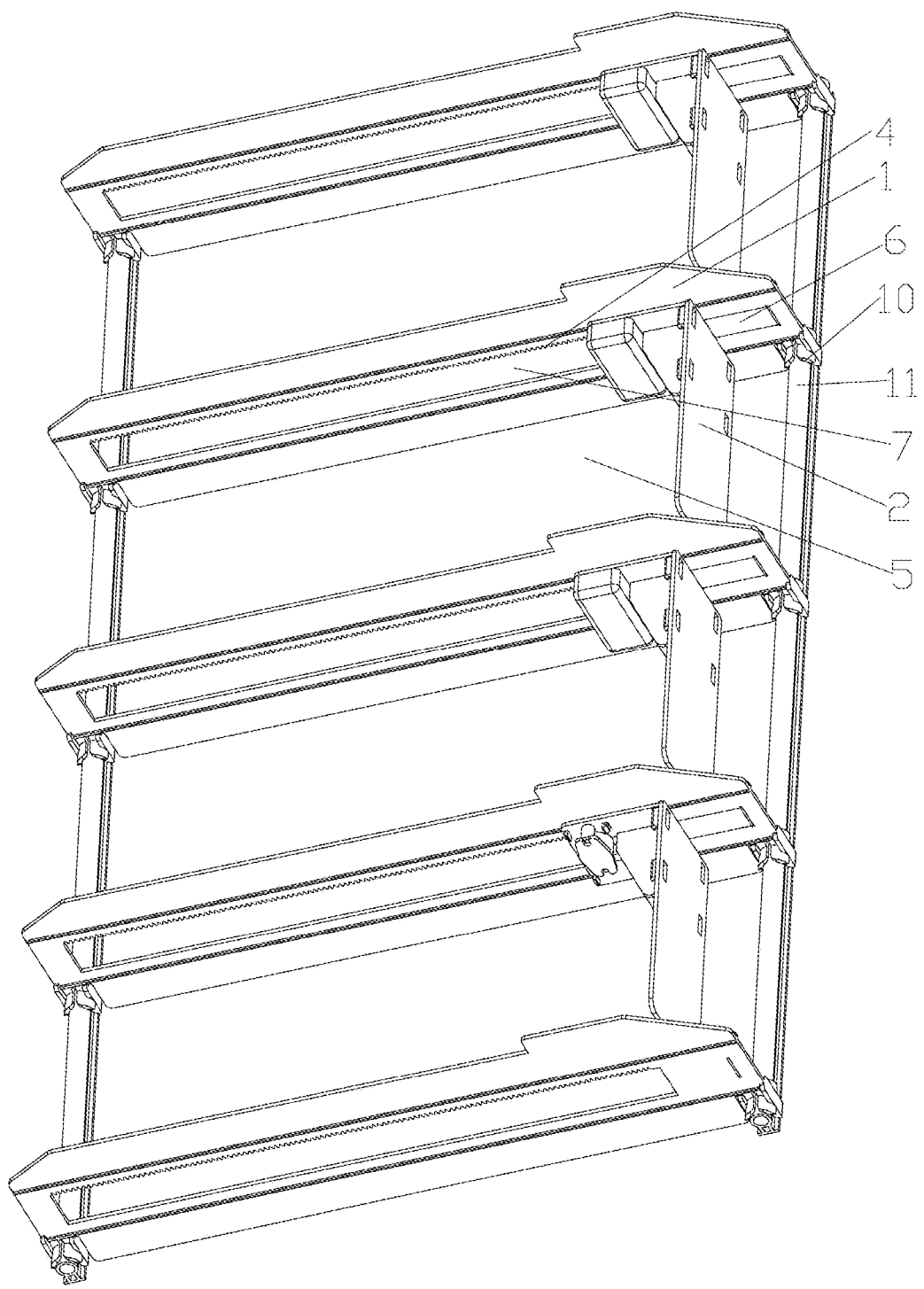
FIG. 1 is a three-dimensional structural schematic diagram of Embodiment 1 of the present invention.
Figure 2:
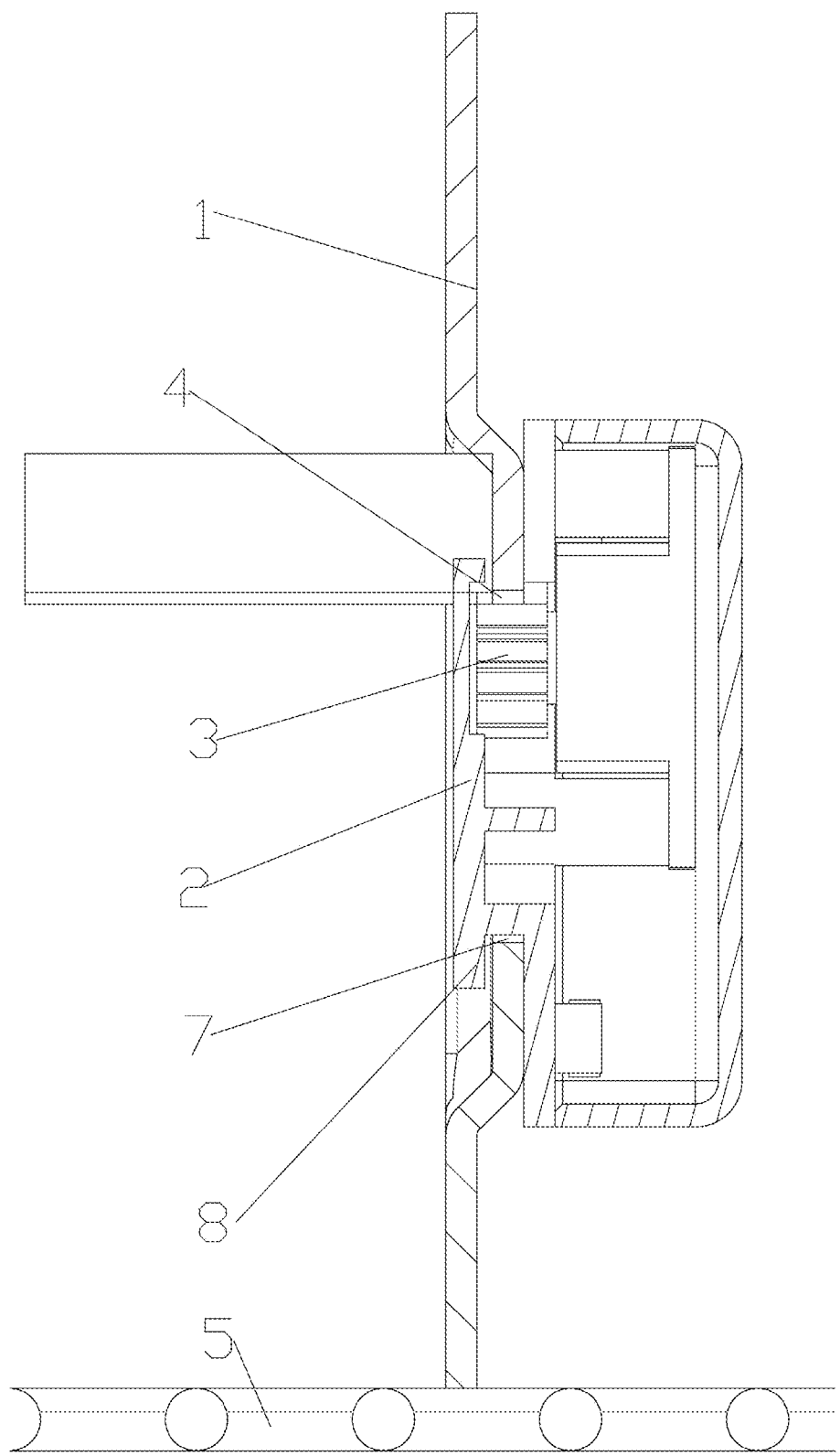
FIG. 2 is a partial sectional view of the present invention.
Figure 3:
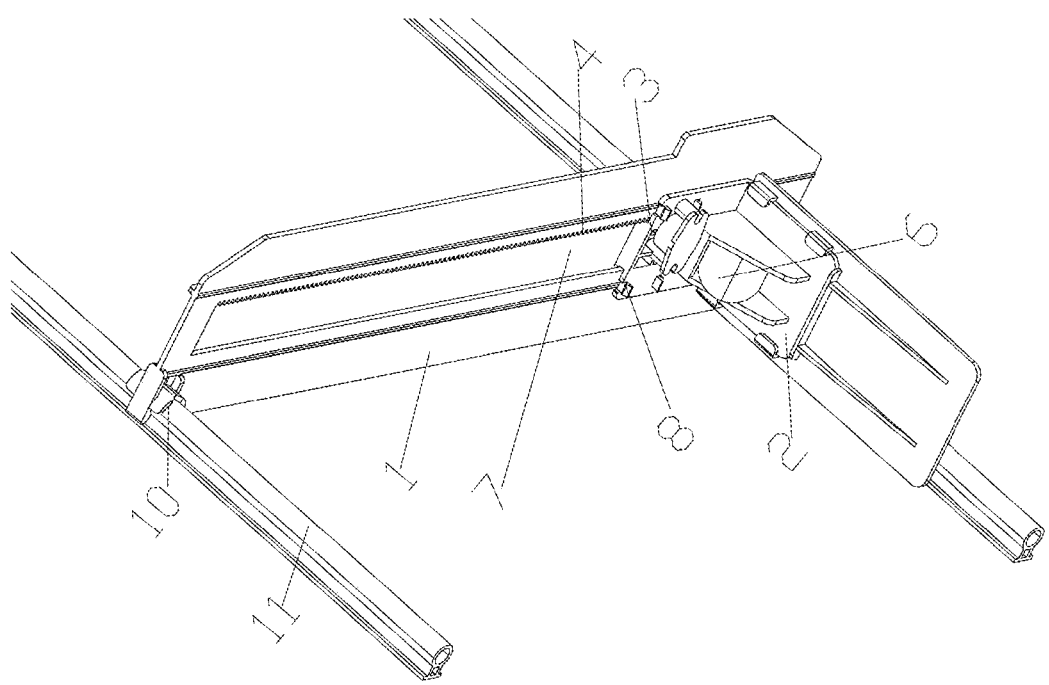
FIG. 3 is a partial three-dimensional structural schematic diagram of Embodiment 1 of the present invention.

As shown in FIGS. 1 to 3, a goods propulsion device provided by the present invention includes a partition plate 1, a push plate 2 slidably connected with the partition plate 1, a gear rack 4 configured on the partition plate 1, a gear 3 that is rotatably connected to the push plate 2 and a reset member 6 that is connected to the push plate 2 and the partition plate 1. The gear 3 is meshed with the gear rack 4. The gear rack 4 is configured along the length direction of the partition plate 1. The reset member 6 is used for driving the push plate 2 to reset its position relative to the partition plate 1.

A shelf comprises a frame body, the aforementioned goods propulsion device and a bottom plate 5 configured on the frame body. The bottom plate 5 is used for supporting or placing goods. The bottom plate 5 is detachably connected to the partition plate 1. The number of the goods propulsion devices is a plurality, and a plurality of goods propulsion devices are configured side by side on the bottom plate 5. The push plate 2 is able to come into contact with the goods. Specifically, the reset member 6 can be a coiled spring. When the reset member 6 is rotatably mounted on the push plate 2, the free end of the reset member 6 is connected to one end of the partition plate 1 near the outer side of the frame after passing through the push plate 2. In the initial state, the push plate 2 is close to the outer side of the frame body. During the actual placement of goods, the goods are placed between two adjacent partition plates 1, and the goods come into contact with the push plate 2 and push it towards the inner side of the frame body. The gear 3 is driven towards the inner side of the frame body through the push plate 2, causing the gear 3 to rotate with respect to the push plate 2 and move towards the inner side of the frame body with respect to the gear rack 4. At this time, the reset member 6 is in a stretched state and stores elastic potential energy. Repeating the above action, the goods located on the outer side of the frame push the goods located on the inner side of the frame body and the push plate 2 towards the inner side of the frame body until a plurality of the goods are placed in parallel between two adjacent partition plates 1, and the outermost goods come into contact with a blocking plate 9 or a connecting member 11. When it is necessary to take out goods from between two adjacent partition plates 1, the outermost goods located on the frame body are taken out, and the reset member 6 releases its elastic potential energy and drives the gear 3 to rotate towards the outer side of the frame through the push plate 2, thereby pushing a plurality of goods towards the outer side of the frame body and making them tightly arranged. That is, every time an item is taken out, the push plate 2 will push the remaining items one position forward, until the outermost goods come into contact with the blocking plate 9 or the connecting member 11. Repeat the above removal operation until a plurality of the goods between two adjacent partition plates 1 have all been removed. The structure of the invention is simple and compact. Users can assemble the goods propulsion devices with different types or sizes of bottom plates 5 according to their actual needs to complete the assembly of the goods propulsion device and the bottom plate 5, and then connect the bottom plate 5 to the frame body. The assembly of the goods propulsion device with the bottom plate 5 and/or the frame body is convenient, and the goods propulsion device has strong practicability and good applicability. The reset member 6 is easy to produce and install. The reset of the push plate 2 is convenient. The push plate 2 has good stability and high precision when it moves relative to the partition plate 1.

Further, the gear 3 can be a dampening gear. During the actual process of picking up goods, a product located on the outer side of the shelf is taken out from between two adjacent partition plate 1. The reset member 6 drives the gear 3 to rotate through the push plate 2, and the gear 3 has a relatively high resistance when it rotates by itself. Therefore, the gear 3 rotates slowly. The gear 3 limits the push plate 2 to push the goods slowly outward through the gear rack 4. Due to the slow pushing speed of the push plate 2, the product is not easily overturned. This avoids the problem of the product falling outside the shelf and causing damage to the product, and improving stability and safety of the product transportation process.

Further, a sliding groove 7 is hollowed out on the partition plate 1, and the gear rack 4 is configured on the inner side wall of the sliding groove 7. The push plate 2 is configured with snap structures 8 on both the upper and lower sides respectively, and the two snap structures 8 are slidably engaged with the upper and lower side walls of the sliding groove 7 respectively.

Specifically, the push plate 2 has an approximate L-shaped plan view, and the gear 3 is rotatably configured within the snap structures 8 and can protrude into the sliding groove 7. During actual use, the snap structures 8 are locked on the outer side wall of the sliding groove 7, and the push plate 2 drives the snap structures 8 to slide in the sliding groove 7, causing the gear 3 to rotate relative to the gear rack 4, thereby realizing pushing of products by the push plate 2 or reset of the push plate 2. The additional configuration of the snap structures 8 and the sliding groove 7 facilitates the limiting and guiding of the movement of the push plate 2 by the partition plate 1, further improving stability of the product pushing process.

Further, the goods propulsion device comprises two snap grooves 10 respectively configured at the two ends of the partition plate 1, and two connecting members 11 that are concave-convexly adapted with the two snap grooves 10 respectively.

Specifically, the goods propulsion device further comprises two snap parts arranged at the two ends of the partition plate 1. Each card joint comprises two elastic snap jaws, and each snap groove 10 is surrounded by the inner walls of two elastic snap jaws. The two connecting members 11 are detachably connected to the bottom plate 5. A plurality of the partition plates 1 are arranged side by side on the bottom plate 5, and the connecting members 11 are respectively inserted into the snap grooves 10 of a plurality of the partition plates 1 arranged side by side, so that a plurality of the partition plates 1 arranged side by side are connected in series through the connecting members 11. In actual use, the connecting members 11 can be connected to the bottom plate 5 by means of adsorption, snap joint or threaded connection. After connecting the plurality of the partition plates 1 in series by the connecting members 11, the connecting members 11 are connected to the bottom plate 5, thereby stabilizing the connection between the goods propulsion devices and the bottom plate 5, and facilitating the connection and installation of the goods propulsion devices with the bottom plate 5. In addition, when the push plate 2 pushes the goods to the connecting members 11 near the outer side of the frame body, the connecting members 11 will come into contact with the goods, effectively preventing the goods falling off from the frame body.

Embodiment 2

Figure 4:
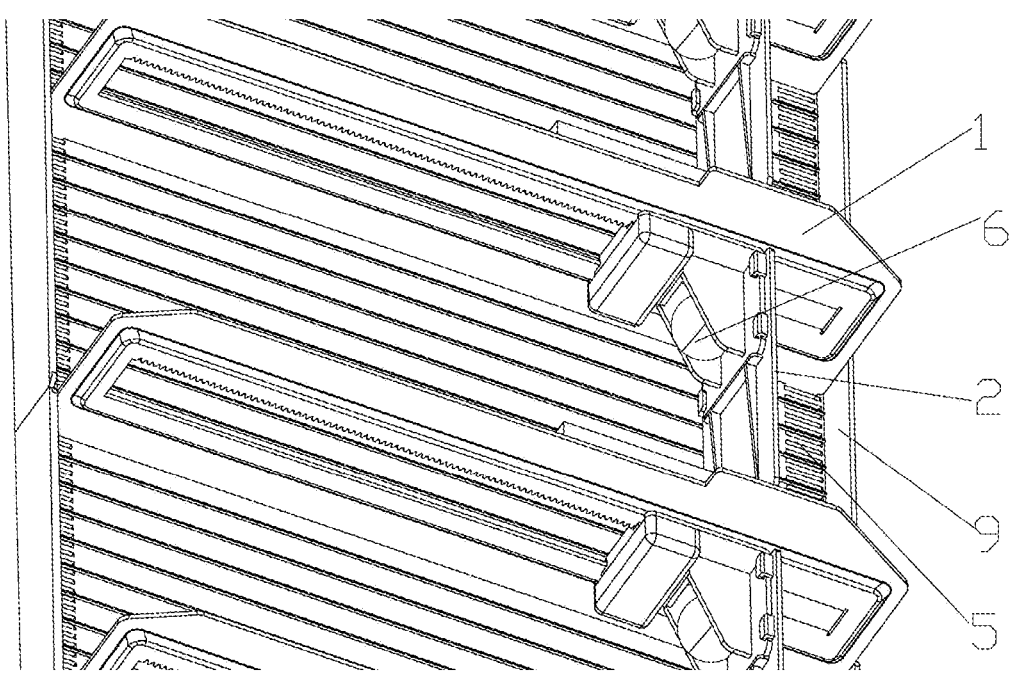
FIG. 4 is a partial three-dimensional structural schematic diagram of Embodiment 2 of the present invention.

As shown in FIG. 4, the difference between this embodiment and the embodiment 1 is that the goods propulsion device further comprises a blocking plate 9 located at one end of the partition plate 1, and the blocking plate 9 is set on the bottom plate 5. A plurality of snap grooves is provided on the bottom plate 5, and the partition plate 1 can be inserted into the snap grooves, making the assembly of the partition plate 1 and the bottom plate 5 convenient.

Specifically, the blocking plate 9 is set closer to the outer side of the frame body, and is used for preventing goods between adjacent partition plates 1 falling off from the bottom plate 5 to the outside of the frame body. The height of the blocking plate 9 is 10-20 mm. Preferably, the height of the blocking plate 9 is 15 mm. In the actual pick-up process, due to the slow pushing speed of the push plate 2, the blocking plate 9 does not need to be very high. The goods are not easy to tip over during the pushing process. The goods are not easy to fall over the blocking plate 9, and are not easy to be directly pushed out of the blocking plate 9. The stability of the goods during the pushing process is strong. Moreover, when it is necessary to take out the goods pushed close to the blocking plate 9, the goods can be taken out without lifting them too high. Similarly, the goods can be placed between adjacent partition plates 1 without lifting them too high over the blocking plate 9. It is convenient to take and place the goods, and the production cost of the blocking plate 9 is low.

The remaining structures of this embodiment are the same as those of embodiment 1. The identical structures are described in embodiment 1 and will not be repeated here.

All technical features of this embodiment can be freely combined according to actual needs.

The above embodiments are the preferred implementations of the present invention. In addition, the present invention can be implemented in other ways without departing from the technical idea of the present invention, and any obvious substitutions are within the protection scope of the present invention.

The invention claimed is:

1. A goods propulsion device adapted to be disposed on a shelf, the goods propulsion device comprising a partition plate, a push plate slidably connected to the partition plate, a gear rack disposed on the partition plate, a gear rotatably connected to the push plate, and a reset member connected to both the push plate and the partition plate; the gear meshed with the gear rack; the gear rack disposed along the length direction of the partition plate; the reset member used for driving the push plate to reset.

2. The goods propulsion device according to claim 1, wherein the gear is a dampening gear.

3. The goods propulsion device according to claim 1, wherein the partition plate comprises a sliding groove; the gear rack is disposed on an inner side wall of the sliding groove; upper and lower sides of the push plate respectively comprise snap structures; and the snap structures are respectively slidably engaged with upper and lower side walls of the sliding groove.

4. The goods propulsion device according to claim 3, wherein the gear is rotatably disposed within the snap structures and is configured to protrude into the sliding groove.

5. The goods propulsion device according to claim 1, further comprising two snap grooves respectively disposed at both ends of the partition plate and two connecting members respectively concave-convexly adapted with the two snap grooves.

6. A shelf comprises a shelf body, the goods propulsion device as claimed in claim 1, and a bottom plate detachably connected to the partition plate.

7. The shelf according to claim 6, wherein the number of the goods propulsion devices is a plurality; and a plurality of the goods propulsion devices are configured side by side on the bottom plate.

8. The shelf according to claim 6, wherein the goods propulsion device further comprises a blocking plate located at one end of the partition plate; and the blocking plate is disposed on the bottom plate.

* * * * *